United States Patent
Jin et al.

(10) Patent No.: US 11,101,881 B2
(45) Date of Patent: Aug. 24, 2021

(54) SATELLITE CONSTELLATION REALIZATION METHOD FOR IMPLEMENTING COMMUNICATION BY UTILIZING A RECURSIVE ORBIT

(71) Applicant: TSINGHUA UNIVERSITY, Beijing (CN)

(72) Inventors: Jin Jin, Beijing (CN); Jian Yan, Beijing (CN); Lin Ling Kuang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 179 days.

(21) Appl. No.: 15/779,326

(22) PCT Filed: Feb. 17, 2017

(86) PCT No.: PCT/CN2017/073854
§ 371 (c)(1),
(2) Date: May 25, 2018

(87) PCT Pub. No.: WO2018/148919
PCT Pub. Date: Aug. 23, 2018

(65) Prior Publication Data
US 2021/0167847 A1 Jun. 3, 2021

(51) Int. Cl.
*H04B 7/185* (2006.01)
*B64G 1/10* (2006.01)

(52) U.S. Cl.
CPC ..... *H04B 7/18519* (2013.01); *H04B 7/18521* (2013.01); *H04B 7/18541* (2013.01); *B64G 1/1007* (2013.01); *B64G 1/1085* (2013.01)

(58) Field of Classification Search
CPC ............ H04B 7/18519; H04B 7/18521; H04B 7/18541; B64G 1/1007; B64G 1/1085
See application file for complete search history.

(56) References Cited

U.S. PATENT DOCUMENTS 5,855,341 A * 1/1999 Aoki ...................... B64G 1/242
244/158.8
5,999,127 A * 12/1999 Dezelan ............. H04B 7/18521
342/352

(Continued)

FOREIGN PATENT DOCUMENTS

| CN | 1233889 A | 11/1999 |
| CN | 103269245 A | 8/2013 |
| CN | 106209207 A | 12/2016 |

OTHER PUBLICATIONS

International Patent Application No. PCT/CN2017/073854; Int'l Search Report; dated May 4, 2017; 2 pages.

*Primary Examiner* — Dominic E Rego
(74) *Attorney, Agent, or Firm* — BakerHostetler

(57) ABSTRACT

The disclosure includes determining a regression period and a semi-major axis of an orbit, inclination, eccentricity and argument of perigee of the orbit; determining both the number of satellites and the number of orbital planes as n; determining right ascension of an ascending node and a mean anomaly of a first satellite, and sequentially determining right ascension of ascending nodes and mean anomalies of subsequent satellites according to satellite service requirements; determining a set of geostationary orbit satellite networks that need to be coordinated, and width of guard band for interference of non-geostationary satellite constellation on geostationary satellite; at any location on the ground, deployed satellites pass overhead successively along fixed trajectory, a user at ground can simultaneously see satellites when multi-coverage is formed; if satellite trajectory crosses the guard band for interference on the geostationary satellite, then when a currently-accessed satellite enters the guard band, user at ground switches to another satellite not in guard band to continue to implement communication.

7 Claims, 2 Drawing Sheets

(56) References Cited

U.S. PATENT DOCUMENTS

| | | | | |
|---|---|---|---|---|
| 6,019,318 | A * | 2/2000 | Cellier | B64G 1/1007 244/158.4 |
| 6,453,220 | B1 * | 9/2002 | Barker | B64G 1/244 701/3 |
| 6,675,011 | B1 * | 1/2004 | Kita | H04B 7/18541 455/422.1 |
| 9,694,917 | B1 * | 7/2017 | Chao | B64G 1/1085 |
| 2002/0132577 | A1 * | 9/2002 | Draim | B64G 1/1085 455/12.1 |
| 2003/0189136 | A1 * | 10/2003 | Maeda | H04B 7/195 244/158.4 |
| 2004/0065781 | A1 * | 4/2004 | Bingaman | B64G 1/242 244/158.4 |
| 2004/0137842 | A1 * | 7/2004 | Iwata | H04B 7/18541 455/12.1 |
| 2012/0001800 | A1 * | 1/2012 | Tachigi | G01S 19/34 342/357.74 |
| 2017/0233112 | A1 * | 8/2017 | McVicker | B64G 1/242 701/3 |
| 2021/0070477 | A1 | 3/2021 | Herman et al. | |

* cited by examiner

SATELLITE CONSTELLATION REALIZATION METHOD FOR IMPLEMENTING COMMUNICATION BY UTILIZING A RECURSIVE ORBIT

TECHNICAL FIELD

The present invention relates to a technical field of satellite communication, and in particular, to a satellite constellation realization method for implementing communication by utilizing a recursive orbit in a globally-covered non-geostationary orbit communication constellation.

BACKGROUND

Satellite Internet is the best and possibly the only choice in the evolution of the Internet to space. Considering limitations of the geostationary orbital (GSO) position, non-geostationary orbit satellite constellation networks will become an important part of the satellite Internet. Currently, a number of large-scale non-geostationary orbit satellite constellation projects have been put into construction or announced around the world. Among them, the O3b network system built by Google Company adopts an equatorial orbit with an inclination of 0° and an orbit height of 8062 km. Currently, there are 12 satellites in orbit, and each satellite has a total throughput of 12 GBit/s. The main coverage area of the O3b constellation is the area between Lat. 40° S to Lat. 40° N. OneWeb company proposes to provide satellite Internet services through a group of Low Earth Orbit (LEO) satellites, where 720 satellites will be launched to complete initial construction and another 1972 satellites may be launched in the latter stage to complete the final constellation. The constellation has an orbital height of about 1200 km and an orbital inclination of about 88°, and is expected to be completed during 2017-2020, and will cover the whole area of the globe. The next generation Iridium satellite system constellation consists of 66 satellites, with 6 additional in-orbit spare satellites and 9 terrestrial spare satellites. The next generation Iridium satellite system constellation has an orbital height of 781 km and an orbital inclination of about 86.4°, and covers the whole area of the globe.

At present, design methods for each of non-geostationary orbit communication satellite constellations have the problem of common-frequency co-existence with the geostationary orbit satellites. Coordination and allocation of spectrum resources for space communications are organized and managed by the International Telecommunications Union (ITU). In accordance with the current coordination framework and rules of the ITU, the status of the geostationary orbit satellite system takes precedence over that of the non-geostationary orbit satellite system; the latter is required to accomplish a co-existence analysis of frequency domains with a GSO satellite system to ensure that no harmful interference is caused to thousands of GSO satellites in orbit. It is extremely difficult to get a final license for using a frequency.

SUMMARY

In view of the above problems, an object of the present invention is to provide a satellite constellation realization method for implementing communication by utilizing a recursive orbit. The method utilizes regressive characteristics of the recursive orbit to achieve on-demand coverage of key areas and reduction of common-frequency interference on a geostationary orbit satellite by parameter design, facilitating the design, construction and implementation of non-geo stationary orbit satellite constellation systems.

In order to achieve the above objects, the present invention adopts the following technical solution: a satellite constellation realization method for implementing communication by utilizing a recursive orbit, characterized by comprising the following steps: 1) determining a regression period and a semi-major axis of an orbit, as well as an inclination, an eccentricity and an argument of perigee of the orbit; 2) determining both the number of satellites and the number of orbital planes as n according to multi-coverage requirements and mission cost; 3) determining right ascension of ascending node and mean anomaly of a first satellite according to a longitude crossing an equator point designed as needed depending on preset expectations, and sequentially determining right ascension of ascending nodes and mean anomalies of subsequent satellites according to satellite service requirements; 4) determining a set of geostationary orbit satellite networks that need to be coordinated, and a width of a guard band for interference of a non-geostationary satellite constellation on a geostationary satellite; 5) at any location on the ground, all deployed satellites can be seen passing overhead successively along a fixed and identical trajectory in the air, and a user at ground can simultaneously see multiple satellites when multi-coverage is formed; if a satellite trajectory crosses the guard band for interference on the geostationary satellite, then when a currently-accessed satellite enters the guard band, the user at ground switching to another satellite not in the guard band to continue to implement communication.

Preferably, in the step 1), the regression period and the semi-major axis of the orbit are determined in a preset set according to a width of a satellite coverage band and communication delay requirements.

Preferably, the preset set is a set of typical values of the semi-major axis of the recursive orbit:

| Regression period 1/j (sidereal day) | Semi-major axis of the orbit a(km) |
| --- | --- |
| 1 | 42164.19 |
| 1/2 | 26561.78 |
| 1/3 | 20270.44 |
| 1/4 | 16732.88 |
| 1/5 | 14419.96 |
| 1/6 | 12769.58 |
| 1/7 | 11522.47 |
| 1/8 | 10541.06 |
| 1/9 | 9744.99 |
| 1/10 | 9083.99 |

Preferably, in the step 1), the inclination of the orbit is determined according to a distribution of a coverage area in latitude, such that the inclination of the orbit is not lower than the highest latitude of the coverage area minus a geocentric angle corresponding to a half beam width.

Preferably, in the step 1), the eccentricity and the argument of perigee of the orbit are determined according to areas covered at a desired high elevation angle and a crossing direction.

Preferably, in the step 4), longitudes where all the satellites in the deployed constellation cross the equator point are identical; a boundary of common-frequency co-orbital interference to geostationary orbit satellites generated when a satellite crossing the equator point is calculated according to parameters of a satellite communication system and communication parameters of the geostationary satellite near the crossed equator point; and the set of geostationary orbit satellite networks that need to be coordinated and the width of the guard band for interference of the non-geostationary satellite constellation on the geo stationary satellite are determined according to the boundary.

Preferably, the method for calculating the boundary of the common-frequency co-orbital interference to the geostationary orbit satellite generated when the satellite crossing the equator point is as follows: 4.1) according to relevant protection standards of the International Telecommunication Union, obtaining a mathematical model for interference signal power calculation as: $I_1=\lambda_1^2 P_{TX2} G_{TX2}(\theta_1) G_{RX1}'(\theta_2)/4\pi d_1^2$, where $I_1$ is interference signal power, $P_{TX2}$ is a transmission power of a earth station for a non-geosynchronous orbit satellite, $G_{TX2}(\theta_1)$ is a transmitting antenna gain of the earth station for the non-geosynchronous orbit satellite, $G_{RX1}'(\theta_2)$ is a receiving antenna gain of a geosynchronous orbit satellite, $\lambda_1$ is a wavelength corresponding to a communication frequency, $d_1$ is a distance of an interference path, $\theta_1$ is an included angle between an interfering link and a communication link of a non-geosynchronous orbit satellite communication system, and $\theta_2$ is an included angle between the interfering link and a communication link of a geosynchronous orbit satellite communication system; 4.2) according to a power threshold value $I_{th}$ of geosynchronous orbit satellite interference protection standards in a known uplink interference scenario, obtaining a limitation of the interference signal power to be $I_1 \le I_{th}$; 4.3) according to the limitation of the interference signal power and the mathematical model for interference signal power calculation, obtaining a limit range of the included angle between the interfering link and the communication link of the non-geosynchronous orbit satellite communication system as $\theta_1 \ge \theta_{th}$, wherein $\theta_1$ is the boundary of the common-frequency co-orbital interference to the geostationary orbit satellite generated when the satellite crossing the equator point; $\theta_{th}$ is the boundary of the common-frequency co-orbital interference to the geostationary orbit satellite generated by the satellite.

The present invention has the following advantages due to the adoption of the above technical solutions: 1) the present invention can reduce the size of the guard band for interference on the geostationary orbit satellite by utilizing characteristics of the fixed position of a track of subsatellite points crossing an equator point and multiple coverage, and form a strict airspace isolation through simple boundary calculation, realizing common-frequency coexistence of the non-geostationary orbit satellite constellation networks and the geostationary orbit satellite networks. 2) Compared with the existing communication satellite constellation design methods, the present invention can form a strict airspace isolation in a simple implementation form, and avoid common-frequency interference to a geostationary orbit satellite network. 3) The present invention makes full use of the characteristic that a track of subsatellite points of a recursive orbit is a closed curve, and realizes the purpose of reducing the common-frequency interference to the geostationary orbit satellites by designing the track of subsatellite points as needed through adjusting orbital parameters, and superposing tracks of subsatellite points of multiple satellites as one curve. 4) Because a orbital period of the satellite on the recursive orbit is an integral fraction of the rotation period of the Earth, a track of subsatellite points of a satellite running in the recursive orbit is a closed curve on the Earth's surface, and the shape and distribution of the track of subsatellite points of the recursive orbit may be changed by adjusting orbital design parameters of the recursive orbit, its track of subsatellite points has a fixed position on the Earth's surface, and its relative relationship with the geostationary orbit satellites is greatly simplified therewith, and by utilizing this characteristic, the present invention can significantly reduce the degree of difficulty in coordination between non-geostationary orbit satellite networks and geostationary orbit satellite networks. In summary, the present invention can be used widely in the field of mobile communication of satellite communication systems.

DETAILED DESCRIPTION

Figure 1:
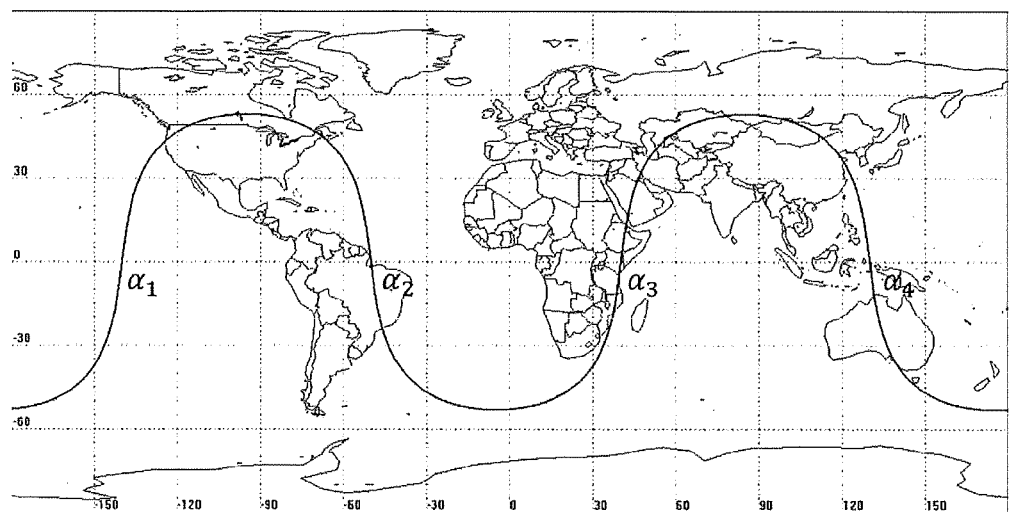
FIG. 1 is a schematic diagram of uniform distribution of 8 satellites along a track of subsatellite points in an embodiment of the present invention.

The present invention is described in detail below with reference to the accompanying drawings and embodiments.

The present invention provides a satellite constellation realization method for implementing communication by utilizing a recursive orbit, which comprises the following steps:

determining a regression period and a semi-major axis of an orbit, as well as an inclination, an eccentricity and an argument of perigee of the orbit;

wherein the regression period and the semi-major axis of the orbit are determined in a preset set according to a width of a satellite coverage band and communication delay requirements; the inclination of the orbit is determined according to a distribution of a coverage area in latitude, such that the inclination of the orbit is not lower than the highest latitude of the coverage area minus a geocentric angle corresponding to a half beam width; the eccentricity and the argument of perigee of the orbit are determined according to areas covered at a desired high elevation angle and a crossing direction;

2) determining both the number of satellites and the number of orbital planes as n according to multi-coverage requirements and mission cost, wherein n is a natural number;

3) determining right ascension of ascending node and mean anomaly of a first satellite according to a longitude crossing an equator point designed as needed depending on preset expectations, determining the time of the satellite passing overhead such that the time of the satellite passing overhead satisfies satellite service requirements, and sequentially determining right ascension of ascending nodes and mean anomalies of subsequent satellites according to the satellite service requirements;

4) determining a set of geostationary orbit satellite networks that need to be coordinated, and a width of a guard band for interference of a non-geostationary satellite constellation on a geostationary satellite;

because longitudes where all the satellites in the constellation deployed according to the above steps cross the equator point are identical, a boundary of common-frequency co-orbital interference to geostationary orbit satellites generated when a satellite crossing the equator point is calculated according to parameters of a satellite communication system and communication parameters of the geostationary satellite near the crossed equator point; and the set of geostationary orbit satellite networks that need to be coordinated and the width of the guard band for interference of the non-geostationary satellite constellation on the geostationary satellite are determined according to the boundary. This will significantly reduce the number of geo stationary orbit satellite networks that need to be coordinated;

wherein a method for calculating the boundary of the common-frequency co-orbital interference to the geostationary orbit satellite generated when the satellite crossing the equator point is as follows:

4.1) according to relevant protection standards of the International Telecommunication Union, obtaining a mathematical model for interference signal power calculation as:

$$I_1 = \lambda_1^2 P_{TX2} G_{TX2}(\theta_1) G_{RX1}'(\theta_2) / 4\pi d_1^2,$$

where $I_1$ is interference signal power, $P_{TX2}$ is a transmission power of a earth station for a non-geosynchronous orbit satellite, $G_{TX2}(\theta_1)$ is a transmitting antenna gain of the earth station for the non-geosynchronous orbit satellite, $G_{RX1}'(\theta_2)$ is a receiving antenna gain of a geosynchronous orbit satellite, $\lambda_1$ is a wavelength corresponding to a communication frequency, $d_1$ is a distance of an interference path, $\theta_1$ is an included angle between an interfering link and a communication link of a non-geosynchronous orbit satellite communication system, and $\theta_2$ is an included angle between the interfering link and a communication link of a geosynchronous orbit satellite communication system;

4.2) according to a power threshold value $I_{th}$ of geosynchronous orbit satellite interference protection standards in a known uplink interference scenario, obtaining a limitation of the interference signal power to be $I_1 \leq I_{th}$;

4.3) according to the limitation of the interference signal power and the mathematical model for interference signal power calculation, obtaining a limit range of the included angle between the interfering link and the communication link of the non-geosynchronous orbit satellite communication system as $\theta_1 \geq \theta_{th}$, wherein $\theta_1$ is the boundary of the common-frequency co-orbital interference to the geostationary orbit satellite generated when the satellite crossing the equator point; $\theta_{th}$ is the boundary of the common-frequency co-orbital interference to the geostationary orbit satellite generated by the satellite.

A satellite in the recursive orbit crosses over the equator at several fixed longitude points, the above calculation is performed on the geosynchronous orbit satellite communication system near the several longitude points, to obtain the boundary of the common-frequency co-orbital interference to the geostationary orbit satellite generated when the satellite crossing the points on the equator.

5) at any location on the ground, all deployed satellites can be seen passing overhead successively along a fixed and identical trajectory in the air, and a user at ground can simultaneously see multiple satellites when multi-coverage is formed; if a satellite trajectory crosses the guard band for interference on the geostationary satellite, then when a currently-accessed satellite enters the guard band, the user at ground switching to another satellite not in the guard band to continue to implement communication, thus avoiding the common-frequency co-orbital interference on the geostationary orbit satellite network through a strict airspace isolation.

In the above step 1), a specific set means that a semi-major axis of an orbit can only be selected from a preset set according to a constraint that a recursive orbit period is an integral fraction of the rotation period of the Earth, and the set is shown in Table 1.

TABLE 1

A Set of Typical Values of the Semi-major Axis of the Recursive orbit

| Regression period 1/j (sidereal day) | Semi-major axis of the orbit a(km) |
| --- | --- |
| 1 | 42164.19 |
| 1/2 | 26561.78 |
| 1/3 | 20270.44 |
| 1/4 | 16732.88 |
| 1/5 | 14419.96 |
| 1/6 | 12769.58 |
| 1/7 | 11522.47 |
| 1/8 | 10541.06 |
| 1/9 | 9744.99 |
| 1/10 | 9083.99 |

The satellite constellation realization method for implementing communication by utilizing the recursive orbit of the present invention will be further described below through specific embodiments.

A non-geostationary orbit communication satellite constellation is set up to provide global coverage. A recursive orbit with a period of ½, i.e., with a semi-major axis of 26561.78 km, is selected from Table 1 based on the communication delay, the orbital distribution of the existing communication satellites, the coverage band requirements, and the launch cost. Through comparison, a circular orbit with an inclination of 53.13° and an eccentricity of 0 is selected. Combined with the analysis on the distribution of geostationary orbit communication satellites, a position where a track of subsatellite points crosses the equator is determined. The final track of subsatellite points is shown in FIG. 1, which crosses the equator at four points $\alpha_1$, $\alpha_2$, $\alpha_3$ and $\alpha_4$.

According to the communication system parameters of this constellation and combined with a typical method for simulation and analysis of communication parameters of four geostationary orbit satellite networks near the crossed equator point, a boundary of airspace isolation between the constellation and the geostationary orbit satellite networks where no interference occurs can be determined. For example, if the width of the airspace isolation band is ±10°, the constellation will naturally have airspace isolation for the geostationary orbit satellite networks outside four sections of $\alpha_1 \pm 10°$, $\alpha_2 \pm 10°$, $\alpha_3 \pm 10°$, $\alpha_4 \pm 10°$ without taking any circumvention measures.

Figure 2:
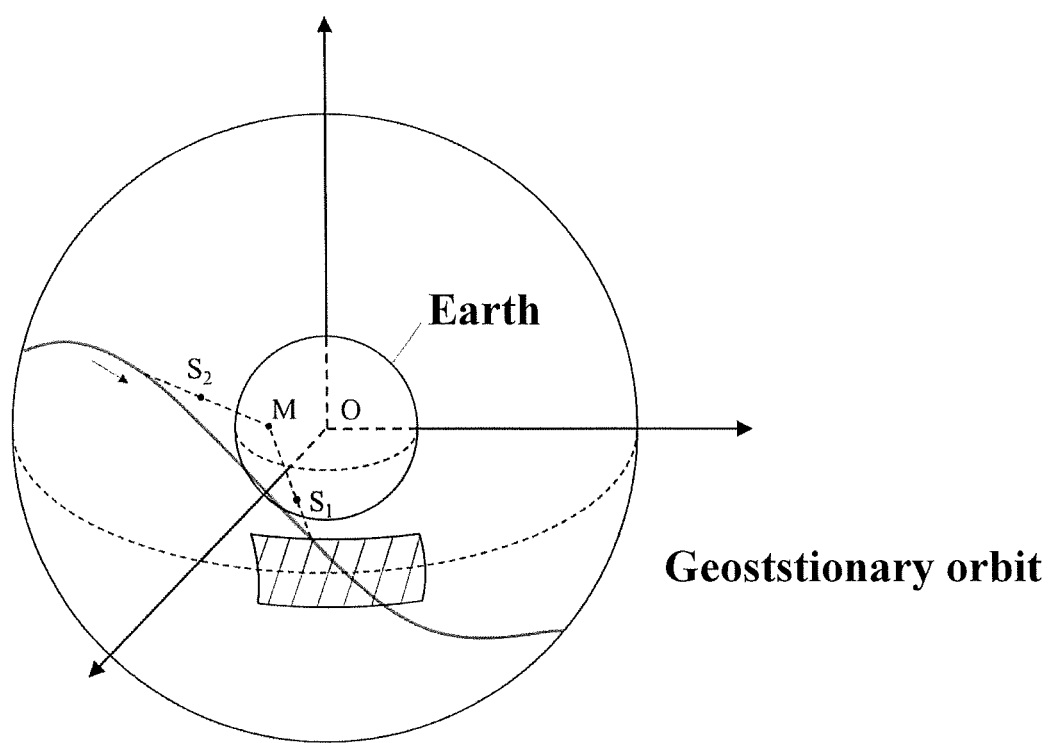
FIG. 2 is a schematic diagram of a satellite trajectory and a guard band for interference on a geostationary orbit over Beijing in an embodiment of the present invention.

According to the satellite constellation configured in this embodiment, at any position on the ground, n satellites in the constellation travel along the same time-invariant trajectory in the air. If 1 or 2 (up to two) of the above 4 geostationary orbit sections can be seen at this position on the ground, then a zone of 10° southward and northward respectively along the section (in an east-west direction) in the air is designated as the guard band for interference. FIG. 2 shows a connection line of the geostationary orbit satellites, the guard band for interference on the geostationary orbit and the satellite trajectory of the constellation of the embodiment seen from Beijing. As shown in FIG. 2, in this embodiment, two satellites S1 and S2 in the constellation successively pass over Beijing, and a user M at ground in Beijing prefers to select the satellite S1 as an access satellite to implement communication. When the satellite S1 enters the guard band, the user M at ground adjusts the beam direction to access to the visible satellite S2 not in the guard band to continue the implementation of communication. When the satellite S2 enters the guard band for interference, the user at ground selects the satellite S3 passing overhead subsequently, to continue the implementation of communication. Due to the multi-coverage design, the majority of users at ground in multi-coverage areas can see satellites that are not in the guard zone for interference at any time, ensuring absolute airspace isolation between the constellation and the geostationary orbit satellite networks.

The geostationary orbit satellite is located at a fixed position relative to the ground. In this embodiment, the satellite trajectory of the constellation is fixed relative to the ground, and the satellites successively pass at a uniform velocity on the trajectory. The user at ground can rapidly calculate the guard band for interference on the geostationary orbit and the satellite trajectories according to the ephemeris, so as to implement communication or a satellite skip operation according to the actual situation.

In summary, the communication satellite constellation of the present invention is composed of satellites distributed on n orbital planes. These orbital planes have the same semi-major axis, inclination, eccentricity and argument of perigee. n satellites are deployed on each orbital plane. The n satellites have the same shape of tracks of subsatellite points. The tracks of subsatellite points of these satellites are superposed as a closed curve on the Earth's surface by selecting the right ascension of the ascending node and the mean anomaly, and cross the equator at a finite longitude designed on demand. When the number of satellites is large enough, multi-coverage can be formed on the ground. By the user at ground switching available satellites in the field of view, an airspace isolation with the geostationary orbit satellites visible to the user at ground is formed, realizing the purpose of avoiding common-frequency co-orbital interference on the geostationary orbit satellites, achieving common-frequency co-existence of the non-geostationary orbit satellite constellation networks and the geostationary orbit satellite networks.

The above embodiments are only used to describe the present invention, and each step may be varied. Based on the technical solutions of the present invention, all improvements and equivalent variations to individual steps according to the principle of the present invention should not be excluded outside the protection scope of the present invention.

What is claimed is:

1. A satellite constellation realization method for implementing communication by utilizing a recursive orbit, characterized in that, the method comprises following steps:
   1) determining a regression period and a semi-major axis of an orbit, as well as an inclination, an eccentricity and an argument of perigee of the orbit;
   2) determining both the number of satellites and the number of orbital planes as n according to multi-coverage requirements and mission cost;
   3) determining right ascension of ascending node and mean anomaly of a first satellite according to a longitude crossing an equator point designed as needed depending on preset expectations, and sequentially determining right ascension of ascending nodes and mean anomalies of subsequent satellites according to satellite service requirements;
   4) determining a set of geostationary orbit satellite networks that need to be coordinated, and a width of a guard band for interference of a non-geostationary satellite constellation on a geostationary satellite;
   5) at any location on the ground, all deployed satellites can be seen passing overhead successively along a fixed and identical trajectory in the air, and a user at ground can simultaneously see multiple satellites when multi-coverage is formed; if a satellite trajectory crosses the guard band for interference on the geostationary satellite, then when a currently-accessed satellite enters the guard band, the user at ground switching to another satellite not in the guard band to continue to implement communication.

2. The satellite constellation realization method for implementing communication by utilizing a recursive orbit according to claim 1, characterized in that: in the step 1), the regression period and the semi-major axis of the orbit are determined in a preset set according to a width of a satellite coverage band and communication delay requirements.

3. The satellite constellation realization method for implementing communication by utilizing a recursive orbit according to claim 2, characterized in that: the preset set is a set of typical values of the semi-major axis of the recursive orbit:

| Regression period 1/j (sidereal day) | Semi-major axis of the orbit α (km) |
|---|---|
| 1 | 42164.19 |
| 1/2 | 26561.78 |
| 1/3 | 20270.44 |
| 1/4 | 16732.88 |
| 1/5 | 14419.96 |
| 1/6 | 12769.58 |
| 1/7 | 11522.47 |
| 1/8 | 10541.06 |
| 1/9 | 9744.99 |
| 1/10 | 9083.99. |

4. The satellite constellation realization method for implementing communication by utilizing a recursive orbit according to claim 1, characterized in that: in the step 1), the inclination of the orbit is determined according to a distribution of a coverage area in latitude, such that the inclination of the orbit is not lower than the highest latitude of the coverage area minus a geocentric angle corresponding to a half beam width.

5. The satellite constellation realization method for implementing communication by utilizing a recursive orbit according to claim 1, characterized in that: in the step 1), the eccentricity and the argument of perigee of the orbit are determined according to areas covered at a desired high elevation angle and a crossing direction.

6. The satellite constellation realization method for implementing communication by utilizing a recursive orbit according to claim 1, characterized in that: in the step 4), longitudes where all the satellites in the deployed constellation cross the equator point are identical; a boundary of common-frequency co-orbital interference to geostationary orbit satellites generated when a satellite crossing the equator point is calculated according to parameters of a satellite communication system and communication parameters of the geostationary satellite near the crossed equator point; and the set of geostationary orbit satellite networks that need to be coordinated and the width of the guard band for interference of the non-geostationary satellite constellation on the geostationary satellite are determined according to the boundary.

7. The satellite constellation realization method for implementing communication by utilizing a recursive orbit according to claim 6, characterized in that: a method for calculating the boundary of the common-frequency co-orbital interference to the geostationary orbit satellite generated when the satellite crossing the equator point is as follows:

4.1) according to relevant protection standards of the International Telecommunication Union, obtaining a mathematical model for interference signal power calculation as:

$$I_1 = \lambda_1^2 P_{TX2} G_{TX2}(\theta_1) G_{RX1}'(\theta_2) / 4\pi d_1^2,$$

where $I_1$ is interference signal power, $P_{TX2}$ is a transmission power of a earth station for a non-geosynchronous orbit satellite, $G_{TX2}(\theta_1)$ is a transmitting antenna gain of the earth station for the non-geosynchronous orbit satellite, $G_{RX1}'(\theta_2)$ is a receiving antenna gain of a geosynchronous orbit satellite, $\lambda_1$ is a wavelength corresponding to a communication frequency, $d_1$ a distance of an interference path, $\theta_1$ is an included angle between an interfering link and a communication link of a non-geosynchronous orbit satellite communication system, and $\theta_2$ is an included angle between the interfering link and a communication link of a geosynchronous orbit satellite communication system;

4.2) according to a power threshold value $I_{th}$ of geosynchronous orbit satellite interference protection standards in a known uplink interference scenario, obtaining a limitation of the interference signal power to be $I_1 \leq I_{th}$;

4.3) according to the limitation of the interference signal power and the mathematical model for interference signal power calculation, obtaining a limit range of the included angle between the interfering link and the communication link of the non-geosynchronous orbit satellite communication system as $\theta_1 \geq \theta_{th}$, wherein $\theta_1$ is the boundary of the common-frequency co-orbital interference to the geostationary orbit satellite generated when the satellite crossing the equator point; $\theta_{th}$ is the boundary of the common-frequency co-orbital interference to the geostationary orbit satellite generated by the satellite.

* * * * *